United States Patent [19]

Eilingsfeld et al.

[11] Patent Number: 4,483,795
[45] Date of Patent: * Nov. 20, 1984

[54] SUBSTITUTED PHENYL DISAZO DYES CONTAINING A 2-AMINO-SUBSTITUTED THIAZOLE RADICAL

[75] Inventors: Heinz Eilingsfeld, Frankenthal; Guenter Hansen; Guenther Seybold, both of Ludwigshafen; Georg Zeidler, Dannstadt-Schauernheim, all of Fed. Rep. of Germany

[73] Assignee: BASF Aktiengesellschaft, Ludwigshafen, Fed. Rep. of Germany

[*] Notice: The portion of the term of this patent subsequent to Feb. 8, 2000 has been disclaimed.

[21] Appl. No.: 433,887

[22] Filed: Oct. 13, 1982

Related U.S. Application Data

[63] Continuation of Ser. No. 931,248, Aug. 4, 1978, Pat. No. 4,372,885.

[30] Foreign Application Priority Data

Aug. 9, 1977 [DE] Fed. Rep. of Germany ....... 2735751
Apr. 15, 1978 [DE] Fed. Rep. of Germany ....... 2816505

[51] Int. Cl.$^3$ .................. C09B 31/14; C09B 33/12; D06P 1/18; D06P 3/54
[52] U.S. Cl. .................. 534/756; 534/763; 534/764
[58] Field of Search .................. 260/154, 156, 158

[56] References Cited

U.S. PATENT DOCUMENTS

| | | |
|---|---|---|
| 3,816,391 | 6/1974 | Coates et al. .................. 260/158 |
| 4,046,752 | 9/1977 | Hohmann et al. .................. 260/158 |
| 4,083,844 | 4/1978 | Gottschlich et al. ........... 260/158 X |
| 4,124,581 | 11/1978 | Von Der Bruck et al. ..... 260/158 X |
| 4,372,885 | 2/1983 | Eilingsfeld et al. ................. 260/158 |

Primary Examiner—Floyd D. Higel
Attorney, Agent, or Firm—Oblon, Fisher, Spivak, McClelland & Maier

[57] ABSTRACT

Compounds of the general formula I

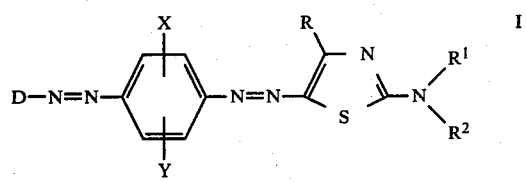

where
D is the radical of a diazo component,
R is hydrogen, hydroxy or unsubstituted or substituted alkyl, alkenyl, cycloalkyl, aralkyl, phenyl or heterocyclic ring,
$R^1$ and $R^2$ independently of one another are hydrogen or unsubstituted or substituted alkyl, alkenyl, alkynyl, cycloalkyl, aralkyl or aryl, or
$R^1$ and $R^2$ together with the nitrogen are a saturated heterocyclic 5-membered to 7-membered ring,
X is hydrogen, chlorine, bromine, alkyl of 1 to 4 carbon atoms, alkoxy of 1 to 4 carbon atoms, allyloxy, β-cyanoethoxy, benzyloxy, phenoxy, β-alkoxycarbonylethoxy, where alkoxy is of 1 to 4 carbon atoms, alkylmercapto of 1 to 4 carbon atoms, phenylmercapto or alkanoylamino of 1 to 4 carbon atoms, and
Y is chlorine, alkyl of 1 to 4 carbon atoms, allyloxy, alkoxy of 1 to 4 carbon atoms or β-cyanoethoxy, or
X and Y together are a fused benzene ring which is unsubstituted or substituted by alkyl alkoxy chlorine or bromine.

The compounds are in particular suitable for dyeing cotton and union fabrics of cotton and synthetic fibers, preferably polyesters. The dyeings obtained are, in part, very fast.

7 Claims, No Drawings

SUBSTITUTED PHENYL DISAZO DYES CONTAINING A 2-AMINO-SUBSTITUTED THIAZOLE RADICAL

The present application is a continuation of U.S. Ser. No. 931,248, filed Aug. 4, 1978 which issued as U.S. Pat. No. 4,372,885.

BACKGROUND OF THE INVENTION

SUMMARY OF THE INVENTION

The present invention relates to a compound of the general formula I

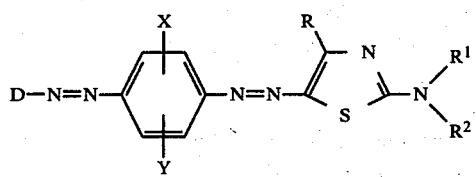

where

D is the radical of a diazo component,

R is a hydrogen, hydroxy or unsubstituted or substituted alkyl, alkenyl, cycloalkyl, aralkyl, phenyl or heterocyclic ring, $R^1$ and $R^2$ independently of one another are hydrogen or unsubstituted or substituted alkyl, alkenyl, alkynyl, cycloalkyl, aralkyl or aryl, or $R^1$ and $R^2$ together with the nitrogen are a saturated heterocyclic 5-membered to 7-membered ring, and X is hydrogen, chlorine, bromine, alkyl of 1 to 4 carbon atoms, alkoxy of 1 to 4 carbon atoms, allyloxy, β-cyanoethoxy, benzyloxy, phenoxy, β-alkoxycarbonylethoxy, where alkoxy is of 1 to 4 carbon atoms, alkylmercapto of 1 to 4 carbon atoms, phenylmercapto or alkanoylamino of 1 to 4 carbon atoms and Y is chlorine, alkyl of 1 to 4 carbon atoms, allyloxy, alkoxy of 1 to 4 carbon atoms or β-cyanoethoxy, or X and Y together are a fused benzene ring, the naphthalene nucleus formed being unsubstituted or substituted by alkyl, alkoxy, chlorine or bromine

DESCRIPTION OF THE PREFERRED EMBODIMENTS

Specific examples of radicals X and Y, in addition to those already mentioned in giving the general definition, are:

$CH_3$, $C_2H_5$, $C_3H_7$, $C_4H_9$, $OCH_3$, $OC_2H_5$, $OC_3H_7$, $OC_4H_9$, $H_3COOCC_2H_4O$, $H_5C_2OOCC_2H_4O$, $H_7C_3OOCC_2H_4O$, $H_9C_4OOCC_2H_4O$, $H_3CCONH$, $H_5C_2CONH$, $CH_3S$, $H_5C_2S$, $H_7C_3S$ and $H_9C_4S$.

Examples of radicals R, in addition to hydrogen and hydroxyl, are alkyl or alkenyl of 1 to 5 carbon atoms which is unsubstituted or substituted by hydroxyl, chlorine, cyano, alkoxy of 1 to 4 carbon atoms, alkanoyloxyl of 1 to 4 carbon atoms, alkanoyl of 1 to 4 carbon atoms, alkoxycarbonyl (where alkoxy is of 1 to 4 carbon atoms), alkylmercapto of 1 to 4 carbon atoms, phenylmercapto, carbamoyl (which is unsubstituted or substituted) or sulfamoyl; cyclohexyl; phenylalkyl, where alkyl is of 1 to 5 carbon atoms; phenyl which is unsubstituted or is monosubstituted or polysubstituted by chlorine, bromine, hydroxyl, alkoxyl of 1 to 4 carbon atoms, alkyl of 1 to 4 carbon atoms, phenyl, phenoxy, alkylmercapto of 1 to 4 carbon atoms phenylmercapto, alkanoylamino of 1 to 5 carbon atoms, β-cyanoethoxy, β-alkoxyethoxy (where alkoxy is of 1 to 4 carbon atoms), β-alkoxycarbonylethoxy (where alkoxy is of 1 to 4 carbon atoms), β-cyanoethylmercapto, β-alkoxyethylmercapto (where alkoxy is of 1 to 4 carbon atoms) or β-alkoxycarbonylethylmercapto (where alkoxy is of 1 to 4 carbon atoms) or β-alkoxycarbonylethylmercapto (where alkoxy is of 1 to 4 carbon atoms); furyl, pyridyl or thienyl.

Specific examples of radicals R, in addition to those already mentioned, are:

$C_6H_3(CH_3)_2$, $C_6H_4CH_3$, $C_6H_4C_2H_5$, $C_6H_4Cl$, $C_6H_3Cl_2$, $C_6H_4Br$, $C_6H_3Br_2$, $C_6H_4F$, $C_6H_3F_2$, $C_6H_4OCH_3$, $C_6H_4OC_2H_5$, $C_6H_4OC_2H_5$, $C_6H_4OC_2H_4CN$, $C_6H_4OC_2H_4COOCH_3$, $C_6H_4OC_2H_4COOC_2H_5$, $C_6H_4OC_6H_5$, $C_6H_4NHCOCH_3$, $C_6H_4NHCOC_2H_5$, $C_6H_{NH2}$, $C_6H_4NHCH_3$,

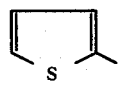

$C_6H_4SCH_3$, $C_6H_4SC_6H_5$, $CH_3$, $C_2H_5$, $ClCH_2$, $C_2H_5OOC\text{-}CH_2$, $CH_3OOC\text{-}Ch_2$ and $NC\text{-}CH_2$.

The radicals $R_1$ and $R_2$, which may be identical or different, are hydrogen or, for example, alkyl of 1 to 8 carbon atoms which is unsubstituted, alkyl of 2 to 8 carbon atoms which is subsititued by hydroxyl, cyano, alkoxycarbonyl (where alkoxy is of 1 to 8 carbon atoms), alkoxy of 1 to 8 carbon atoms, phenoxy, phenoxyethoxy or benzyloxy, cyclohexyl, bensyl, phenylethyl, phenylhydroxyethyl, phenylpropyl, phenylbutyl, phenyl, which is unsubstituted or substituted by chlorine, methyl, methoxy or ethoxy, polyalkoxyalkyl, hydroxypolyalkoxyalkyl, alkanoyloxyalkyl or alkoxycarbonylalkyl of the type mentioned below.

Specific examples of radicals $R^1$ and $R^2$ are, amongst alkyl radicals, methyl, ethyl, propyl and butyl; amongst hydroxyalkyl radicals, β-hydroxyethyl, β-hydroxypropyl, γ-hydroxypropyl and ω-hydroxyhexyl; β-alkoxycarbonylethyl (where alkoxy is of 1 to 4 carbon atoms) and the radicals of the formulae

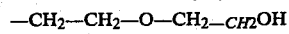

—$(CH_2)_3$—O—$(CH_2)_4$—OH

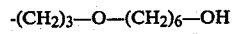

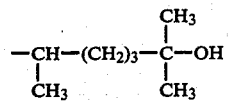

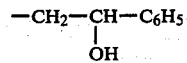

$C_2H_4Cl$ $CH_2CH_2CN$ $CH_2CH_2COOalkyl$ (where alkyl is of 1 to 8 carbon atoms)

$CH_2CH=CH_2$

(where alkyl is of 1 to 4 carbon atoms)

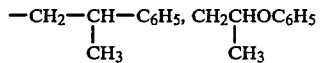

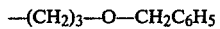

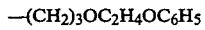

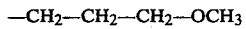

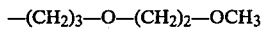

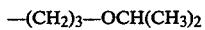

and the acyloxyalkyl radicals of the formulae

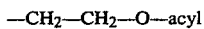

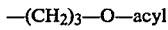

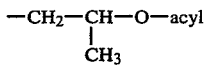

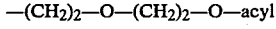

where acyl may be, for example, —COH, —COCH₃, —COCH₂—O—C₆H₅, or COOB or CONHB, where B is methyl or phenyl.

R¹ and R² may also be components of a heterocyclic ring, for example

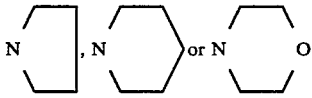

The radical D of the diazo component is most frequently derived from the aniline, naphthalene, thiophen, aminoazobenzene, thiazole or benzthiazole series.

Examples of substitutes of the radicals D of the diazo component are:

In the benzene series: chlorine, bromine, nitro, cyano, trifluoromethyl, methylsulfonyl, ethylsulfonyl, phenylsolfonyl, carbomethoxy, carbobutoxy, carbi-β-methoxyethoxy, carboxamide and sulfonamide, which are unsubstituted or N-monosubstituted or N-disubstituted, methyl, ethyl, methoxy and ethoxy. In this context, examples of N-substituents of carboxamide or sulfonamide groups are methyl, ethyl, propyl, butyl, β-ethylhexyl, β-methoxyethyl, γ-methoxypropyl and γ-ethoxypropyl; the amide portion of a substituted carboxamide or sulfonamide may also be pyrrolidide, piperidide or morpholide.

In the azobenzene series: chlorine, bromine, nitro, cyano, methyl, hydroxyl, ethyl, methoxy and ethoxy.

In the heterocyclic series: chlorine bromine, nitro, cyano, methyl, ethyl, phenyl, methoxy, ethoxy, carbomethoxy, carboethoxy, acetyl, methylsulfonyl and ethylsulfonyl.

Specific examples of amines from which the radical D may be derived are: aniline, o-, m- and p-toluidine, o-, m- and p-nitroaniline, o-, m- and p-cyanoaniline, 2,4-dicyanoaniline, o-, m- and p-chloroaniline, o-, m- and p-bromoaniline, 2,4,6-tribromoaniline, 2-chloro-4-nitroaniline, 2-bromo-4-nitroaniline, 2-cyano-4-nitroaniline, 2-methylsulfonyl -4-nitroaniline, 2-methyl-4-nitroaniline, 2-methoxy-4-nitroaniline, 4-chloro-2-nitroaniline, 4-methyl-2-nitroaniline, 4-methoxy-2-nitroaniline, 1-amino-2-trifluoromethyl-4-chlorobenzene, 2-chloro-5-aminobenzonitrile, 2-amino-5-chlorobenzonitrile, 1-amino-2-nitrobenzene-4-sulfonic acid n-butylamide and β-methoxyethylamide, 2,4-dinitroaniline, 2,4-dinitro-6-chloroaniline, 2,4-dinitro-6-bromoaniline, 2,4-dinitro-6-cyanoaniline, 1-amino-2,4-dinitrobenzene-6-methyl- sufone, 2,6-dichloro-4-nitroaniline, 2,6-dibromo-4-nitroaniline, 2-chloro-6-bromo-4-nitroaniline, 2,6-dicyano-4-nitroaniline, 2-cyano-4-nitro-6-chloroaniline, 2-cyano-4-nitro-6-bromoaniline, 1-aminobenzene-4-methylsulfone, 1-amino-2,6-dibromo-benzene-4-methylsulfone, 1-amino-2,6-dichlorobenzene- 4-methylsulfone, 1-amino-2,4-dinitrobenzene-6-carboxylic acid methyl ester and β-methoxyethyl ester, propyl 3,5-dichloroanthranilate, β-methoxyethyl 3,5-dibromoanthranilate, N-acetyl-p-phenylenediamine, 4-aminoacetophenone, 4-and 2-amino-benzophenone, 2- and 4-aminodiphenylsulfone, methyl, ethyl, propyl, butyl, isobutyl, β-methoxyethyl and β-ethoxyethyl 2-aminobenzoate, 3-aminobenzoate and 4-aminobenzoate, methyl, isobutyl, β-methoxyethyl and β-butoxyethyl 5-nitro-anthranilate, 3- and 4-aminobenzoic acid amide, methylamide, propylamide, butylamide, isobutylamide, cyclohexylamide, β-ethylhexylamide, γ-methoxypropylamide and γ-ethoxypropylamide, 2-, 3- and 4-aminobenzoic acid dimethylamide, diethylamide, pyrrolidide and morpholide, 2-, 3- and 4-aminobenzenesulfonic acid dimethylamide and diethylamide and 2-aminobenzthiazole.

Examples of suitable diazo components of the aminoazobenzene series are: 4-aminoazobenzene, 2',3-dimethyl-4-aminoazobenzene, 3',2-dimethyl-4-aminoazobenzene, 2,5-dimethyl-4-aminoazobenzene, 2-methyl-5-methoxy-4-aminoazobenzene, 2,5-dimethoxy-4- aminoazobenzene, 4'-methoxy-2,5-dimethyl-4-aminoazobenzene and 3-methoxy-4-aminoazobenzene.

The diazo components preferably have, for example, the following formulae:

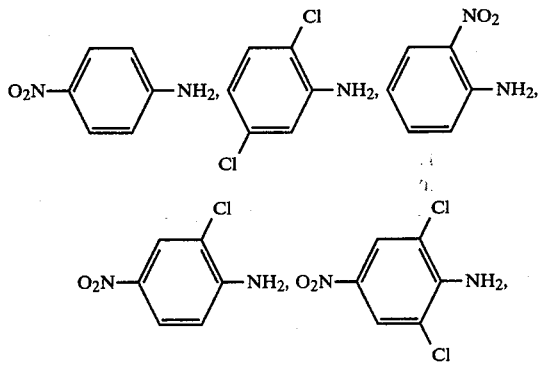

-continued
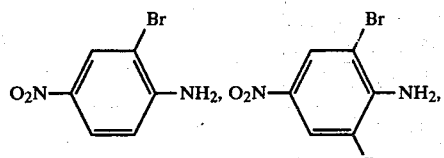
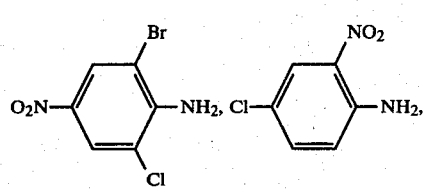
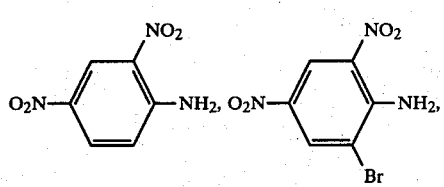
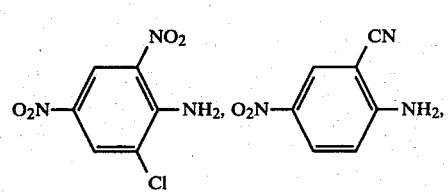
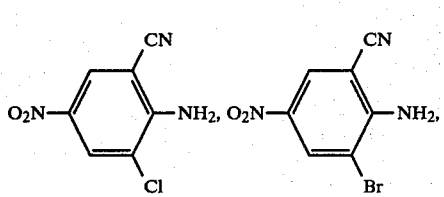
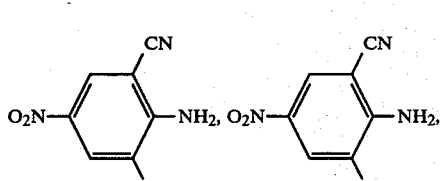
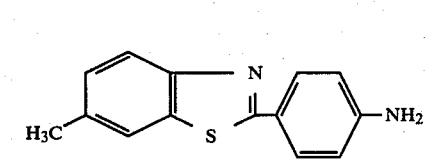
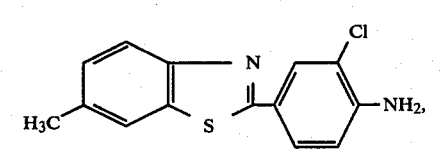
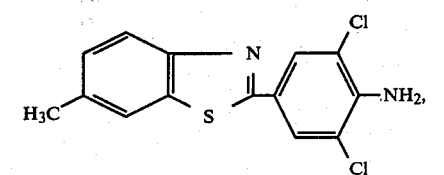
-continued
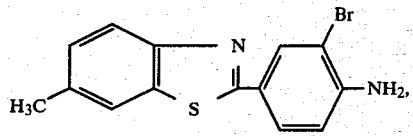
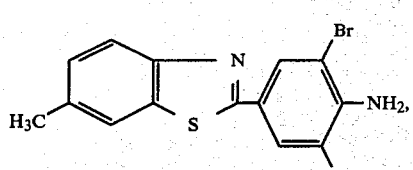
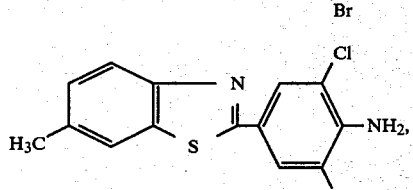
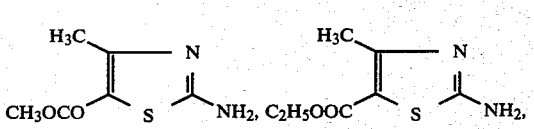
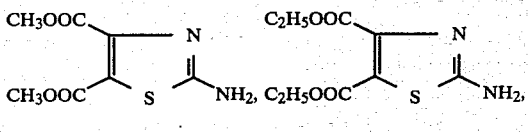
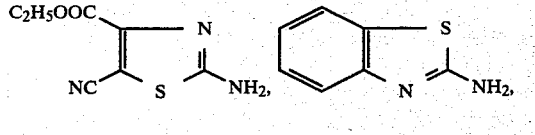
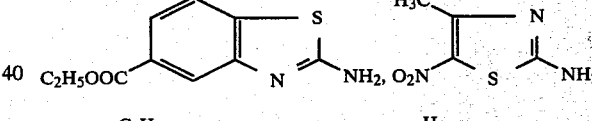
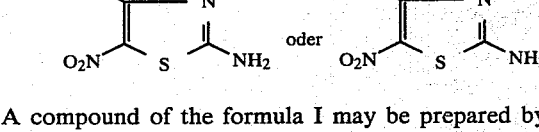
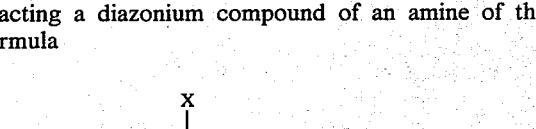
A compound of the formula I may be prepared by reacting a diazonium compound of an amine of the formula
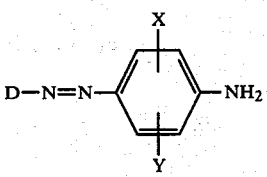
with a coupling component of the formula II
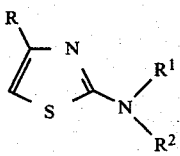
D, X, Y, R, $R^1$ and $R^2$ having the meanings given above.

Details of the method of preparation may be found in the Examples, where parts and percentages are by weight, unless stated otherwise.

Compounds of the formula II may be prepared by a method similar to that described in French Pat. No. 1,600,940.

In particular, the invention provides compounds of the formula I, where

D is phenyl which is substituted by fluorine, chlorine, bromine, nitro, phenylazo, cyano, alkyl of 1 to 5 carbon atoms, alkoxy of 1 to 4 carbon atoms, alkoxycarbonyl (where alkoxy is of 1 to 8 carbon atoms,

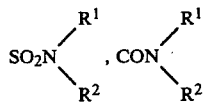

or trifluoromethyl, or is thiazolyl which is unsubstituted or substituted by methyl, nitro, alkanoyl of 1 to 4 carbon atoms, alkoxycarbonyl (where alkoxy is of 1 to 5 carbon atoms), cyano, carbamoyl or phenyl, or is benzthiazolyl which is unsubstituted or substituted by chlorine, bromine, alkoxy of 1 to 4 carbon atoms, nitro, alkoxycarbonyl (where alkoxy is of 1 to 4 carbon atoms) or methyl-sulfonyl or is 1,2-benzisothiazolyl or 2,1-benzisothiazolyl, which are unsubstituted or substituted by chlorine, bromine, nitro or cyano, R is phenyl which is unsubstituted or is monosubstituted or polysubstituted by chlorine, bromine, hydroxyl, alkoxy of 1 to 4 carbon atoms, phenoxy, alkyl of 1 to 10 carbon atoms, phenyl, alkylmercapto of 1 to 4 carbon atoms, phenylmercapto, alkanoylamino of 1 to 8 carbon atoms, β-cyanoethoxy, β-alkoxyethoxy (where alkoxy is of 1 to 4 carbon atoms), β-alkoxycarbonylethoxy (where alkoxy is of 1 to 4 carbon atoms), β-cyanoethylmercapto, β-alkoxyethylmercapto (where alkoxy is of 1 to 4 carbon atoms) or β-alkoxycarbonyl-ethylmercapto (where alkoxy is of 1 to 4 carbon atoms), or is naphthyl, pyridyl, furyl or thienyl, $R^1$ and $R^2$ independently of one another are hydrogen or allyl or are alkyl of 1 to 4 carbon atoms which is unsubstituted or substituted by cyano, alkoxycarbonyl (where alkoxy is of 1 to 8 carbon atoms), $(OCH_2CH_2)_nOT$,

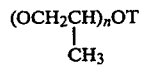

or phenyl, or are cyclohexyl or phenylhydroxyethyl, or are phenyl which is unsubstituted or substituted by chlorine, methyl, methoxy or ethoxy, or $R^1$ and $R^2$ together with the nitrogen are pyrrolidino, piperidino, morpholino, hexamethyleneimino or N-methyl-piperazino, n is 0, 1 or 2, T is hydrogen, alkyl of 1 to 8 carbon atoms, cyclohexyl, benzyl, phenylethyl, phenyl, tolyl or alkanoyl of 1 to 8 carbon atoms, and X is hydrogen, chlorine, bromine, alkyl of 1 to 4 carbon atoms, alkoxy of 1 to 4 carbon atoms, allyloxy, β-cyanoethoxy, benzyloxy, phenoxy, β alkoxycarbonylethoxy (where alkoxy is of 1 to 4 carbon atoms), alkylmercapto of 1 to 4 carbon atoms, phenylmercapto or alkanoylamino of 1 to 4 carbon atoms, and Y is chlorine, alkyl of 1 to 4 carbon atoms, allyloxy, alkoxy of 1 to 4 carbon atoms or β-cyanoethoxy, or X and Y together area fused benzene ring, the naphthalene nucleus formed being unsubstituted or substituted by alkyl of 1 to 4 carbon atoms, chlorine or bromine.

Compounds of particular industrial importance are those of the formula Ia

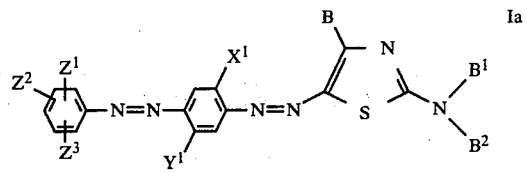

where

B is $C_6H_5$, $C_6H_4CH_3$, $C_6H_4C_2H_5$, $C_6H_4Cl$, $C_6H_3Cl_2$, $C_6H_4OCH_3$, $C_6H_4OC_2H_4CN$, $C_5H_4NHCOCH_3$ or $C_6H_4NH_2$, $B^1$ and B'independently of one another are $CH_3$, $C_2H_5$, $C_3H_7$, $C_4H_9$, $C_2H_4COOCH_3$, $C_2H_4COOC_2H_5$, $C_2H_4CN$, $C_2H_4OH$, $C_2H_4C_6H_5$, $C_2H_4OCOCH_3$, $C_2H_4OC_2H_4OC_6H_5$, $C_2H_4OCH_3$, $C_3H_6OCH_3$, $C_6H_5$, $C_6H_4Cl$, benzyl or $CH_2CH=CH_2$, $X^1$ is $OCH_3$, $OC_2H_5$, $OC_4H_9$, $OC_2H_4CN$, $OC_2H_4COOCH_3$, $CH_3$, $C_2H_5$, $SCH_3$, $NHCOCH_3$ or $NHCOC_2H_5$ and $Y^1$ is $OCH_3$, $OC_2H_5$, $OC_4H_9$, $OC_2H_4CN$, $CH_3$ or $C_2H_5$ and $X^1$ and $Y^1$ may be identical or different, $Z^1$ is hydrogen, chlorine, bromine, cyano or nitro, $Z^2$ is hydrogen, chlorine, bromine or nitro and $Z^3$ is hydrogen, chlorine, bromine, cyano or alkoxycarbonyl (where alkoxy is of 1 to 4 carbon atoms).

The dyes of the formula I are preferentially usable for dyeing and, in particular, printing cotton and union fabrics containing cotton, the other component preferably being a polyester. Suitable dyeing and printing processes are those described in German Pat. No. 1,811,796. The dyes of the invention, which have a high tinctorial strength, give lightfast and wetfat dyeings and prints which also have good fastness to crocking.

EXAMPLE 1

17.2 parts of 2-chloro-4-nitroaniline are diazotized in the conventional manner. A solution of 15.3 parts of 1-amino-2,5-dimethoxybenzene in 300 parts of water and 25 parts of 5-normal hydrochloric acid is run into the filtered nitrite-free diazonium salt solution, whilst stirring. As coupling proceeds, the reaction mixture becomes viscous; it is therefore diluted with about 1,000 parts of water. After completion of coupling, the dye is filtered off and washed neutral with water. The paste of the monoazo dye is stirred into a mixture of 600 parts of acetic acid and 12 parts of concentrated hydrochloric acid at from 50° to 60° C. The temperature is then lowered to 20°–25° C. by external cooling and a solution of 9.0 parts of sodium nitrite is added over from 5 to 10 minutes. After about 60 minutes, the excess nitrite is removed with amidosulfonic acid. A solution of 25.6 parts of 4-phenyl-2-(N-diallylamino)-thiazole in 40 parts of acetic acid is added to the filtered diazonium salt solution over 30 minutes. The pH is then raised to 2.5 with aqueous sodium acetate solution. After completion of coupling, the disazo dye is filtered off, washed first with isopropanol and then with hot water, and dried. The dye which has the following formula

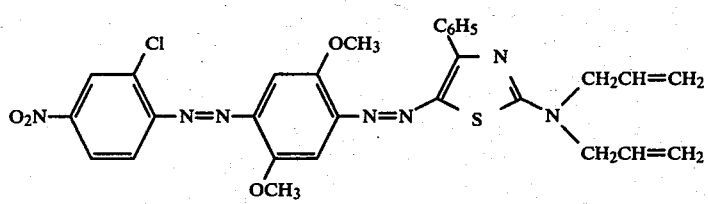

is very suitable for printing cotton or cotton/polyester union fabrics. Navy to black dyeings are obtained.

The dyes summarized in the Table which follows can be prepared by a method similar to that described in Example 1 and give dyeings have similar properties.

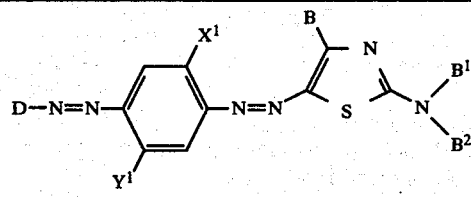

| Example | D | $X^1$ | $Y^1$ | B | $B^1$ | $B^2$ | Hue |
|---|---|---|---|---|---|---|---|
| 2 | ![](Cl, O₂N-phenyl) | OCH₃ | OCH₃ | —C₆H₄—CH₃ (p) | CH₂CH=CH₂ | CH₂CH=CH₂ | navy |
| 3 | " | " | " | —C₆H₃(CH₃)₂ | " | " | " |
| 4 | " | " | " | —C₆H₄—OCH₃ | " | " | " |
| 5 | " | " | " | C₆H₅ | C₂H₅ | C₂H₅ | " |
| 6 | " | " | " | —C₆H₄—NHCOCH₃ | CH₂CH=CH₂ | CH₂CH=CH₂ | " |
| 7 | " | " | " | —C₆H₄—O—C₆H₅ | CH₂CH=CH | CH₂CH=CH₂ | " |
| 8 | " | " | " | —C₆H₄—OC₂H₄CN | " | " | " |
| 9 | " | " | " | —C₆H₄—Cl | " | " | " |
| 10 | " | " | " | —C₆H₃Cl₂ | " | " | " |

-continued

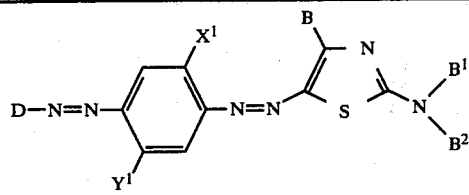

| Example | D | X¹ | Y¹ | B | B¹ | B² | Hue |
|---|---|---|---|---|---|---|---|
| 11 | 4-Cl, 2-NO₂-phenyl | " | " | C₆H₅ | C₂H₅ | C₂H₅ | " |
| 12 | " | " | " | 4-OCH₃-C₆H₄ | CH₃ | CH₃ | " |
| 13 | 2,5-diCl-phenyl | " | " | C₆H₅ | CH₂CH=CH₂ | CH₂CH=CH₂ | reddish blue |
| 14 | " | " | " | 4-CH₃-C₆H₄ | " | " | reddish blue |
| 15 | " | " | " | " | C₂H₅ | C₂H₅ | reddish blue |
| 16 | " | " | " | 4-OCH₃-C₆H₄ | CH₃ | CH₃ | reddish blue |
| 17 | " | " | " | 4-OC₂H₄CN-C₆H₄ | " | " | reddish blue |
| 18 | 4-O₂N-phenyl | " | " | C₆H₅ | C₂H₅ | C₂H₅ | violet |
| 19 | 2,4-diNO₂-phenyl | CH₃ | CH₃ | 4-CH₃-C₆H₄ | CH₂CH=CH₂ | CH₂CH=CH₂ | " |
| 20 | 4-O₂N-phenyl | OCH₃ | OCH₃ | 2,5-diCH₃-C₆H₃ | " | " | " |
| 21 | " | " | " | 4-Cl-C₆H₄ | C₂H₅ | C₂H₅ | " |

-continued

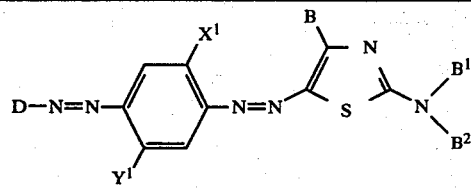

| Example | D | $X^1$ | $Y^1$ | B | $B^1$ | $B^2$ | Hue |
|---|---|---|---|---|---|---|---|
| 22 | " | " | " | 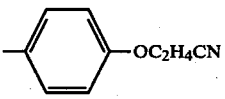—OC$_2$H$_4$CN | " | " | " |

EXAMPLE 23

20.7 parts of 2,6-dichloro-4-nitroaniline are introduced into a mixture of 40 parts of concentrated sulfuric acid and 30 parts of nitrosylsulfuric acid (of from 40 to 45% strength) at 10°–15° C., whilst stirring, and the diazotization is allowed to take place overnight at room temperature. The solution is then poured onto a mixture of 200 parts of ice and 200 parts of water. After having removed excess nitrite, a solution of 15.3 parts of 1-amino-2,5-dimethoxybenzene in 300 parts of water and 25 parts of 5-normal hydrochloric acid is added over about 30 minutes. As coupling proceeds, the reaction mixture becomes viscous; it is therefore diluted with about 700 parts of water. After completion of coupling, the dye is filtered off and washed nuetral with water. The filter cake of the monoazo dye is dissolved in 400 parts of acetic acid by stirring at room temperature and after adding 12 parts of concentrated hydrochloric acid the dye is diazotized with an aqueous solution of 8.0 parts of sodium nitrite. After about 3 hours at 20°–25° C. the diazotization is complete, and a solution of 25.6 parts of 4-phenyl-2-(N-diallylamino)-thiazole in 40 parts of acetic acid is added to the nitrite-free diazonium salt solution. Coupling is then completed by means of an aqueous solution of 10 parts of sodium acetate, at pH 3–4. The dye is filtered off and washed first with isopropanol and then with hot water. After drying under reduced pressure at 60° C., 46 parts of a dark powder having the following formula

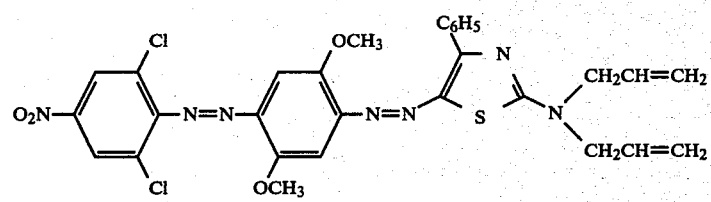

are obtained. This product is very suitable for printing cotton or cotton/polyester union fabrics. Navy to black dyeings are obtained.

The dyes summarized in the Table which follows can be prepared by a method similar to that described in Example 23 and give dyeings having similar properties.

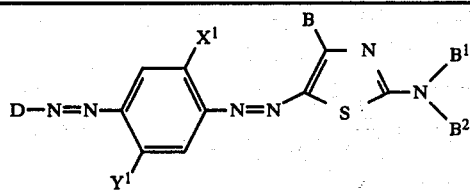

| Example | D | $X^1$ | $Y^1$ | B | $B^1$ | $B^2$ | Hue |
|---|---|---|---|---|---|---|---|
| 24 | O$_2$N-(2,6-diCl-phenyl) | OCH$_3$ | OCH$_3$ | C$_6$H$_5$ | C$_2$H$_5$ | C$_2$H$_5$ | black |
| 25 | " | " | " | " | " | C$_6$H$_5$ | " |
| 26 | " | " | " | 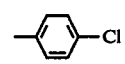—Cl | CH$_2$CH=CH$_2$ | CH$_2$CH=CH$_2$ | " |

-continued

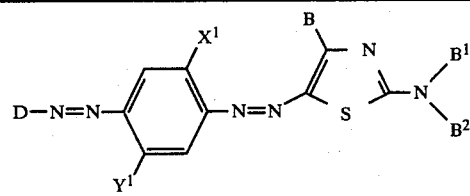

| Example | D | X¹ | Y¹ | B | B¹ | B² | Hue |
|---|---|---|---|---|---|---|---|
| 27 | 3,5-dibromo-4-methyl-nitrobenzene (Br, Br, O₂N-) | " | " | $C_6H_5$ | $C_2H_5$ | $C_2H_4COOC_2H_5$ | " |
| 28 | 3,5-dichloro-4-methyl-nitrobenzene (Cl, Cl, O₂N-) | " | " | -C₆H₄-NHCOCH₃ | $CH_2CH=CH_2$ | $CH_2CH=CH_2$ | " |
| 29 | " | " | " | -C₆H₄-OC₂H₄CN | " | " | " |
| 30 | " | " | $CH_3$ | $C_6H_5$ | " | " | navy |
| 31 | " | " | " | " | $C_2H_5$ | $C_2H_5$ | " |
| 32 | " | " | " | " | " | $C_2H_4COOC_2H_5$ | " |
| 33 | " | " | " | -C₆H₄-OC₂H₄CN | $CH_2CH=CH_2$ | $CH_2CH=CH_2$ | " |
| 34 | " | " | $OCH_3$ | $C_6H_5$ | $C_6H_5$ | $C_2H_4OH$ | " |
| 35 | " | " | " | -C₆H₄-CH₃ | $C_2H_5$ | $C_2H_5$ | black |
| 36 | " | " | $CH_3$ | -C₆H₃(CH₃)₂ | " | $C_2H_4OCOOC_2H_5$ | " |
| 37 | " | " | " | -C₆H₄-OCH₃ | $CH_3$ | $CH_3$ | " |
| 38 | " | " | " | -C₆H₄-O-C₆H₅ | $CH_2CH=CH_2$ | $CH_2CH=CH_2$ | navy |
| 39 | " | " | " | -C₆H₃Cl₂ | " | " | violet |
| 40 | 3-bromo-4-methyl-2,5-dinitrobenzene (NO₂, Br, O₂N-) | $CH_3$ | " | -C₆H₄-NHCOCH₃ | " | " | black |
| 41 | 3,5-dibromo-4-methyl-nitrobenzene (Br, Br, O₂N-) | $OCH_3$ | $OCH_3$ | $C_6H_5$ | " | " | " |
| 42 | " | " | " | " | $C_2H_5$ | $C_2H_5$ | " |
| 43 | " | " | " | " | " | $C_2H_4COOCH_3$ | " |

-continued

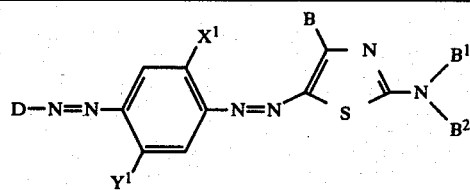

| Example | D | X¹ | Y¹ | B | B¹ | B² | Hue |
|---|---|---|---|---|---|---|---|
| 44 | (Cl, O₂N, Br on benzene) | " | " | " | " | C₂H₅ | " |
| 45 | (NO₂, O₂N on benzene) | " | " | " | CH₂CH=CH₂ | CH₂CH=CH₂ | blue |
| 46 | " | " | " | " | " | " | " |
| 47 | " | " | " | —C₆H₄—NHCOCH₃ | " | " | " |
| 48 | (NO₂, O₂N, Cl on benzene) | CH₃ | CH₃ | C₆H₅ | C₂H₅ | C₂H₅ | " |
| 49 | (NO₂, O₂N, Br on benzene) | " | " | " | " | " | " |
| 50 | (Cl, Cl, Cl on benzene) | OCH₃ | OCH₃ | " | " | " | violet |
| 51 | " | " | " | " | " | C₂H₄CN | " |
| 52 | " | " | " | " | " | C₂H₄COOCH₃ | " |
| 53 | (O₂N, Cl, Cl on benzene) | " | " | " | C₂H₄OCOCH₃ | C₂H₄OCOCH₃ | navy |
| 54 | (H₃C, EtOOC, thiazole) | " | CH₃ | —C₆H₄—OCH₃ | C₂H₅ | C₂H₄COOC₂H₅ | blue |
| 55 | (H₃C, CH₃OOC, thiazole) | " | " | —C₆H₄—CH₃ | " | C₂H₅ | " |
| 56 | (C₂H₅OOC, C₂H₅OOC, thiazole) | " | " | " | " | " | " |

-continued

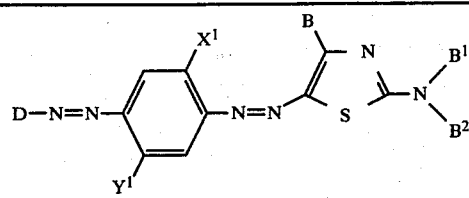

| Example | D | $X^1$ | $Y^1$ | B | $B^1$ | $B^2$ | Hue |
|---|---|---|---|---|---|---|---|
| 57 | C₂H₅OOC-C(=C)-C(OH)=... (thiazole with N, S, HO, C₂H₅OOC) | " | CH₃ | " | " | " | " |
| 58 | CH₃OOC analog (thiazole with HO, CH₃OOC) | " | " | " | " | " | " |
| 59 | benzothiazole | " | OCH₃ | C₆H₅ | CH₂CH=CH₂ | C₂H₄COOC₂H₅ | black |
| 60 | C₂H₅OOC-benzothiazole | " | CH₃ | 2,4-(CH₃)₂-C₆H₃ | C₂H₅ | C₃H₇ | " |
| 61 | H₃C-benzothiazole (with p-tolyl) | " | OCH₃ | C₆H₅ | C₄H₉ | C₄H₉ | " |
| 62 | " | " | CH₃ | p-CH₃O-C₆H₄ | " | " | " |
| 63 | " | " | " | p-HOC₂H₄O-C₆H₄ | C₃H₇ | C₂H₄COOOC₂H₅ | " |
| 64 | " | " | " | " | CH₃ | CH₂—CH₂O—C(=O)—CH₃ | " |
| 65 | H₃C-benzothiazole with 3,5-Cl₂ | " | " | p-CH₃-C₆H₄ | C₂H₅ | " | blue |
| 66 | 3,5-dinitro-2-methyl-phenol (O₂N, NO₂, OH) | " | " | " | " | C₂H₅ | greenish blue |
| 67 | " | " | " | p-Cl-C₆H₄ | CH₂CH=CH₂ | CH₂CH=CH₂ | greenish blue |
| 68 | 5-chloro-3-nitro-2-methyl-phenol (Cl, O₂N, OH) | " | " | C₆H₅ | " | " | blue |

EXAMPLE 69

13.8 parts of p-nitroaniline are diazotized in the conventional manner. A solution of 15 parts of α-naphthylamine in 50 parts of acetic acid is allowed to run into the filtered nitrite-free diazonium salt solution, whilst stirring. As coupling proceeds, the reaction mixture becomes viscous. It is therefore diluted with about 400 parts of water. After completion of coupling, the pH is brought to 6–7 with 30% strength aqueous sodium hydroxide solution. The dye is filtered off and washed thoroughly with water. The paste of the monoazo dye is stirred thoroughly into a mixture of 800 parts of acetic acid and 12 parts of concentrated hydrochloric acid at 50°–60° C. The temperature is then lowered to 0°–10° C. by external cooling and a solution of 8.3 parts of sodium nitrite is added over 5–10 minutes. After about 30 minutes, the excess nitrite is removed with amidosulfonic acid. A solution of 26.6 parts of 2-(n-β-methoxycarbonylethyl-N-ethyl)-4-phenylthiazole in 60 parts of acetic acid is added to the filtered diazonium salt solution over 30 minutes. The pH is then raised to 2.5 with aqueous sodium acetate solution. After completion of coupling, the disazo dye is filtered off, washed first with isopropanol and then with hot water, and dried. The dye, which has the following structure

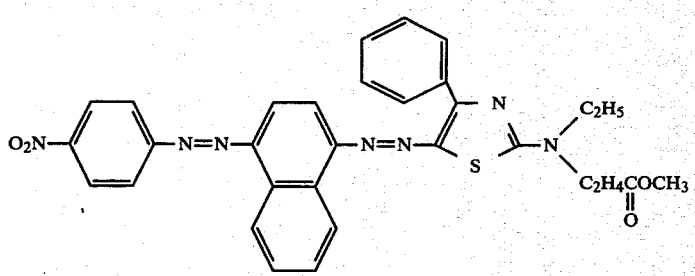

is very suitable for dyeing or printing cotton or cotton-/polyester union fabrics. Navy to black dyeings are obtained.

The dyes summarized in the Table which follows can be prepared by a method similar to that described in Example 1 and give dyeings having similar properties.

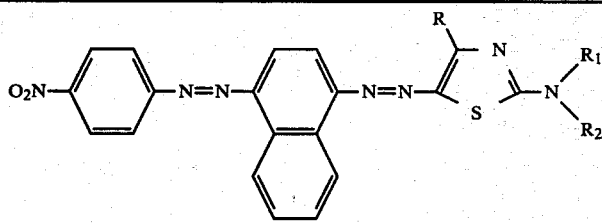

| Example | R | $R^1$ | $R^2$ |
|---|---|---|---|
| 70 | $C_6H_5$ | $CH_3$ | $C_2H_4COCH_3$ ‖ O |
| 71 | " | $C_2H_4OH$ | $CH_3$ |
| 72 | " | " | $C_2H_5$ |
| 73 | " | $CH_3$ | $C_2H_4OCCH_3$ ‖ O |
| 74 | " | $C_2H_5$ | " |
| 75 | " | $CH_2CH=CH_2$ | $CH_2CH=CH_2$ |
| 76 | " | $CH_2$—C₆H₅ | $CH_2$—C₆H₅ |
| 77 | " | $C_2H_5$ | $C_2H_5$ |
| 78 | " | " | $C_2H_4CN$ |
| 79 | " | $CH_3$ | $C_6H_5$ |
| 80 | " | | (cyclohexyl, R1+R2) |
| 81 | " | | (morpholino, R1+R2) |

-continued
| | | | |
|---|---|---|---|
| 82 | " |  | |
| 83 | 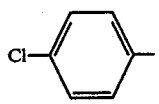 | CH₂CH=CH₂ | CH₂CH=CH₂ |
| 84 | 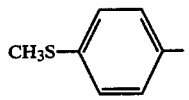 | C₃H₇ | C₃H₇ |
| 85 | 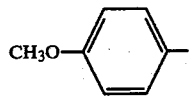 | CH₂CH=CH₂ | CH₂CH=CH₂ |
| 86 | 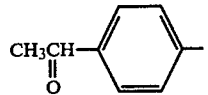 | " | " |
| 87 | " | C₂H₅ | C₂H₅ |
| 88 | " | " | C₂H₄COCH₃ 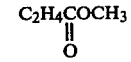 |
| 89 | " | C₃H₇ | C₃H₇ |
| 90 | 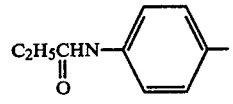 | CH₂CH=CH₂ | C₂H₄COCH₃ |
| 91 | 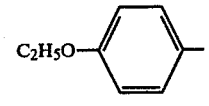 | C₂H₅ | C₂H₅ |
| 92 | 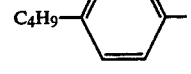 | " | C₂H₄COCH₃ 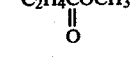 |
| 93 | 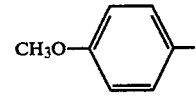 | H | 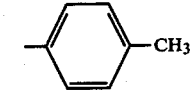 |
| 94 | 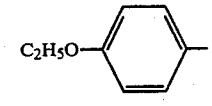 | C₂H₅ | C₂H₄CN |
| 95 | H | " | C₂H₅ |
| 96 | CH₃ | " | C₂H₄COCH₃ 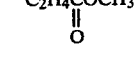 |
| 97 | " | CH₂CH=CH₂ | " |
| 98 | C₂H₅OCCH₂ 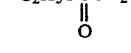 | C₂H₅ | C₂H₅ |

-continued
| | | | | |
|---|---|---|---|---|
| 99 | C₄H₉NHCCH₂ (O double bond) | C₂H₅ | | C₂H₅ |
| 100 | (C₂H₅)₂NCCH₂ (O double bond) | CH₂CH=CH₂ | | CH₂CH=CH₂ |
| 101 | HO | " | | C₂H₅ |
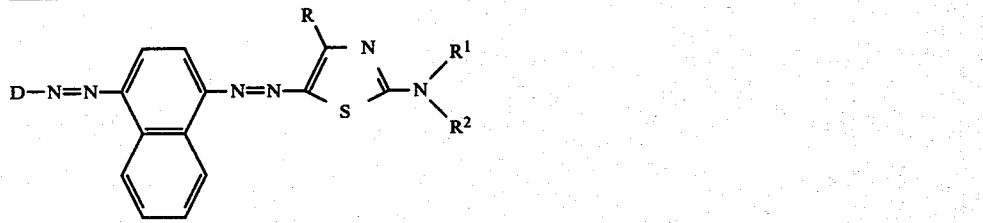
| Example | D | R | R¹ | R² |
|---|---|---|---|---|
| 102 | 3-nitrophenyl | C₆H₅ | C₂H₅ | C₂H₄COCH₃ |
| 103 | " | 4-methoxyphenyl | " | " |
| 104 | " | 4-chlorophenyl | " | " |
| 105 | 3-nitrophenyl | 4-(CH₃CONH)phenyl | " | C₂H₅ |
| 106 | C₆H₅ | " | CH₂CH=CH₂ | CH₂CH=CH₂ |
| 107 | 4-chlorophenyl | C₆H₅ | C₂H₅ | C₂H₄COCH₃ |
| 108 | 2,4-dichlorophenyl | " | " | " |
| 109 | 2,4-dichlorophenyl | C₆H₅ | C₂H₅ | C₂H₅ |
| 110 | 2,4,5-trichlorophenyl | " | " | " |

|     |     |     |     |     |
|-----|-----|-----|-----|-----|
| 111 | 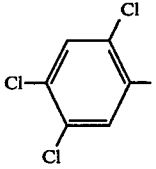 | 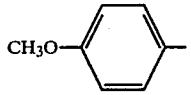 | CH₂CH=CH₂ | CH₂CH=CH₂ |
| 112 | " | 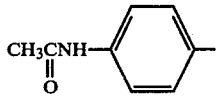 | C₂H₅ | C₂H₅ |
| 113 | 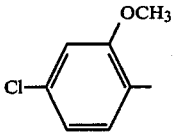 | 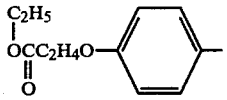 | " | " |
| 114 | " | 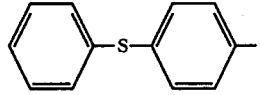 | " | " |
| 115 | " | 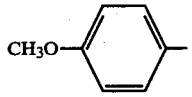 | CH₂CH=CH₂ | CH₂CH=CH₂ |
| 116 | 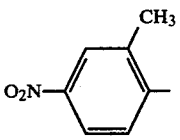 | C₆H₅ | C₂H₅ | C₂H₅ |
| 117 | 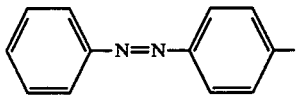 | 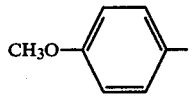 | CH₂CH=CH₂ | CH₂CH=CH₂ |
| 118 | 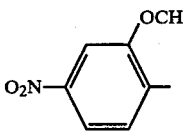 | C₆H₅ | CH₂CH=CH₂ | C₂H₄COCH₃<br>‖<br>O |
| 119 | " | 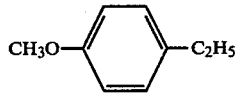 | " | " |
| 120 | " | C₆H₅ | " | C₂H₄CN |
| 121 | 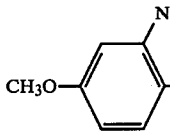 | " | " | C₂H₄COCH₃<br>‖<br>O |
| 122 | 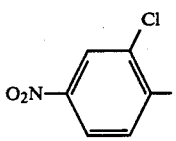 | " | " | C₂H₄COCH₃<br>‖<br>O |
| 123 | " | 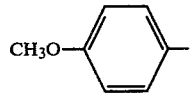 | " | " |

| No. | Col2 | Col3 | Col4 | Col5 |
|---|---|---|---|---|
| 125 | " | $C_6H_5$ | $CH_2CH=CH_2$ | " |
| 126 | 3-Cl-4-($O_2N$)-phenyl (2-chloro-4-nitrophenyl) | $C_2H_5CHN(O)$—C$_6$H$_4$— (4-propionamidophenyl) | $C_2H_5$ | $C_2H_5$ |
| 127 | " | $C_6H_5$ | $C_2H_5$ | $C_2H_4OCCH_3$ (=O) |
| 128 | " | $CH_3O$—C$_6$H$_4$— | " | —C$_6$H$_4$—$CH_3$ |
| 129 | 2,5-dichlorophenyl | $C_6H_5$ | " | $C_2H_4COCH_3$ (=O) |
| 130 | 2,5-dichlorophenyl | $C_6H_5$ | $CH_2CH=CH_2$ | $C_2H_4COCH_3$ (=O) |
| 131 | " | $CH_3O$—C$_6$H$_4$— | " | " |
| 132 | 3,5-dichlorophenyl | $CH_3CHN(O)$—C$_6$H$_4$— | $C_2H_5$ | $C_2H_5$ |
| 133 | 2,4,5-trichlorophenyl | $C_6H_5$ | $CH_2CH=CH_2$ | $CH_2CH=CH_2$ |
| 134 | " | " | $C_3H_7$ | $C_3H_7$ |

EXAMPLE 135

18.3 parts of 2,4-dinitroaniline are introduced into a mixture of 29 parts of nitrosylsulfuric acid (containing 13.1% of dinitrogen trioxide) and 120 parts of 85% strength sulfuric acid at 0°–5° C., whilst stirring. After about 4 hours at 0°–5° C., the diazotization is complete and the solution is added dropwise, whilst stirring, to a solution of 15 parts of α-naphthylamine, 400 ml of water and 15 parts of concentrated hydrochloric acid, which is cooled to 0° C. by adding 400 parts of ice. Coupling is complete after 2–3 hours. The reaction mixture is neutralized with dilute sodium hydroxide solution, the product is filtered off and washed salt-free with water, and thereafter the procedure is continued as in Example 69. The resulting disazo dye, having the following composition

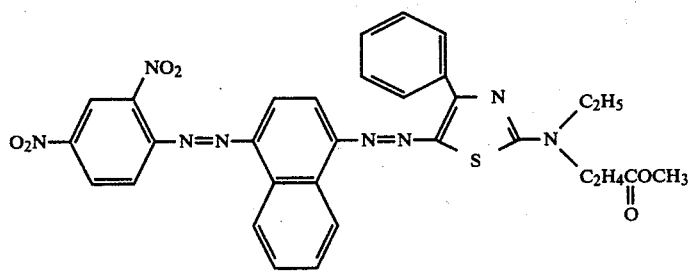

dyes cotton, and cotton/polyester union fabrics, in lightfast greenish blue hues.

The dyes summarized in the Table which follows can be prepared by a method similar to that described in Example 135 and give dyeings having similar properties.

| Example | D | R | $R^1$ | $R^2$ |
|---|---|---|---|---|
| 136 | 2,4-dinitrophenyl | $C_6H_5$ | $C_2H_5$ | $C_2H_5$ |
| 137 | " | " | $CH_2C_6H_5$ | $CH_2C_6H_5$ |
| 138 | " | " | $CH_2CH=CH_2$ | $CH_2CH=CH_2$ |
| 139 | " | 4-$CH_3O$-$C_6H_4$- | " | " |
| 140 | " | 4-Cl-$C_6H_4$- | " | " |
| 141 | " | 4-$CH_3CONH$-$C_6H_4$- | $C_2H_5$ | $C_2H_5$ |
| 142 | " | $C_6H_5$ | " | $C_2H_4CN$ |
| 143 | " | 4-$CH_3O$-$C_6H_4$- | " | " |
| 144 | " | H | " | $C_2H_5$ |
| 145 | " | $CH_3$ | $CH_2CH=CH_2$ | $C_2H_4COCH_3$ |

-continued
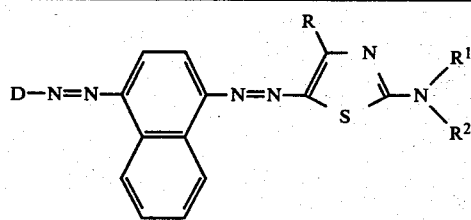
| Example | D | R | R¹ | R² |
|---|---|---|---|---|
| 146 | " | $C_3H_7OCCH_2$ (C=O) | $C_2H_5$ | $C_2H_5$ |
| 147 | " | $C_2H_5NHCCH_2$ (C=O) | " | " |
| 148 | " | $(C_3H_7)_2NCCH_2$ (C=O) | " | " |
| 149 | " | HO | " | " |
| 150 | " | $CH_3$ | H | –C₆H₄–CH₃ |
| 151 | 3-Br-2,4-dinitrophenyl | $C_6H_5$ | $C_2H_5$ | $C_2H_5$ |
| 152 | " | $CH_3O$–C₆H₄– | " | " |
| 153 | 3-Cl-2,4-dinitrophenyl | $C_6H_5$ | $C_6H_5$ | " |
| 154 | " | " | $CH_2CH=CH_2$ | $CH_2CH=CH_2$ |
| 155 | 2,5-dichloro-4-nitrophenyl | " | $C_2H_5$ | $C_2H_5$ |
| 156 | 2-CN-4,6-dinitrophenyl | " | " | " |

-continued
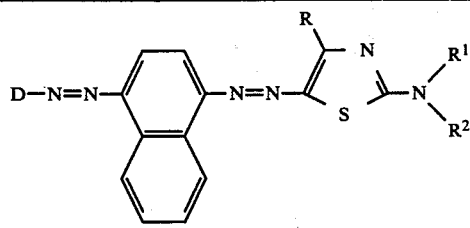
| Example | D | R | R¹ | R² |
|---|---|---|---|---|
| 157 | 2,6-Br₂-4-O₂N-C₆H₂- | " | C₂H₅ | C₂H₄COCH₃ |
| 158 | " | " | " | C₂H₅ |
| 159 | 4-O₂N-C₆H₄- | 4-CH₃O-C₆H₄- | " | " |
| 160 | " | " | " | C₂H₄COCH₃ |
| 161 | 2,6-Cl₂-4-O₂N-C₆H₂- | C₆H₅ | C₂H₅ | C₂H₅ |
| 162 | 2-CN-4-O₂N-6-Br-C₆H₂- | " | " | " |
| 163 | 2-CN-4-O₂N-6-Cl-C₆H₂- | " | " | " |
| 164 | 2-Br-4-O₂N-C₆H₃- | " | " | " |
| 165 | " | 4-CH₃O-C₆H₄- | " | " |
| 166 | " | 4-Cl-C₆H₄- | C₂H₅ | C₂H₄CN |

-continued
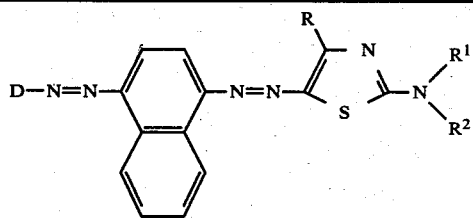
| Example | D | R | R¹ | R² |
|---|---|---|---|---|
| 167 | " | 4-Br-C₆H₄ | " | $C_2H_5$ |
| 168 | " | $CH_3$ | $CH_2CH=CH_2$ | $CH_2CH=CH_2$ |
| 169 | " | $C_6H_5$ | $C_2H_5$ | $C_2H_5$ |
| 170 | 2-CN-4-O₂N-C₆H₃ | " | " | " |
| 171 | 2-CH₃-3-Br-5-O₂N-C₆H₂ | " | $CH_2CH=CH_2$ | $C_2H_4COCH_3$ |
| 172 | 2-OCH₃-3-Br-5-O₂N-C₆H₂ | 4-CH₃O-C₆H₄ | " | " |
| 173 | 2-COOCH₃-3-Br-5-O₂N-C₆H₂ | " | " | " |
| 174 | 2-CON(CH₃)₂-3-Br-5-O₂N-C₆H₂ | $C_6H_5$ | $C_2H_5$ | $C_2H_5$ |
| 175 | 2-COOCH₃-5-O₂N-C₆H₃ | " | " | " |
| 176 | 2-SO₂CH₃-5-O₂N-C₆H₃ | " | " | " |

-continued
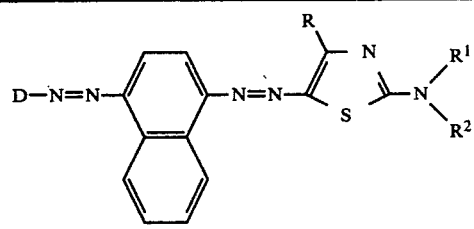
| Example | D | R | R¹ | R² |
|---|---|---|---|---|
| 177 | 2-SO₂CH₃, 4-O₂N, 5-Br-phenyl | " | " | C₂H₄COCH₃ (=O) |
| 178 | 2-SO₂CH₃, 4-O₂N, 6-NO₂-phenyl | " | C₃H₇ | " |
| 179 | 2-Br, 4-CH₃O₂S, 6-Br-phenyl | " | C₂H₅ | C₂H₅ |
| 180 | 2-Cl, 4-CH₃O₂S-phenyl | CH₃O-C₆H₄- | " | " |
| 181 | 2-NO₂, 4-CH₃O₂S-phenyl | " | " | C₂H₄COCH₃ (=O) |
| 182 | 2-Br, 4-H₂NO₂S-phenyl | C₆H₅ | " | " |
| 183 | 2-Cl, 4-NC-phenyl | " | " | C₂H₄COC₂H₅ (=O) |
| 184 | " | " | CH₂CH=CH₂ | " |
| 185 | " | " | C₂H₅ | C₂H₅ |
| 186 | 2-benzothiazolyl | " | " | " |

-continued

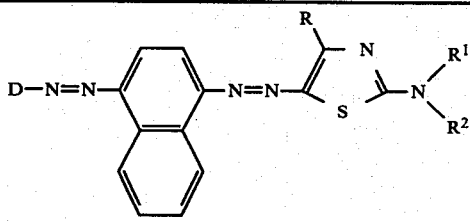

| Example | D | R | R¹ | R² |
|---|---|---|---|---|
| 187 | (ethyl ester, ethyl ester substituted thiazole) | " | CH₂CH=CH₂ | CH₂CH=CH₂ |
| 188 | (ethyl ester, CN substituted thiazole) | " | " | " |
| 189 | (CH₃, CN, NC substituted thiazole) | " | " | " |
| 190 | (thiazole) | " | " | " |

We claim:

1. An azo dye of the formula:

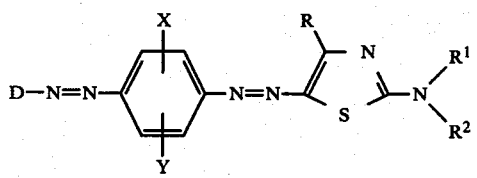

wherein:
D is phenyl substituted by chlorine, bromine or fluorine and cyano;
X and Y are each methoxy or ethoxy;
R is phenyl, tolyl or methoxyphenyl; or
R¹ and R² are each $C_1$–$C_4$ alkyl or allyl, and are the same.

2. The azo dye of claim 1 wherein:
D is phenyl substituted by two chlorine, and one cyano group;
R is phenyl; and
R¹ is N—$(C_2H_5)_2$.

3. The azo dye of claim 2 wherein:
D is phenyl substituted by two chlorine and one cyano group; and
R is phenyl substituted with methyl.

4. The azo dye of claim 3 wherein:
R is phenyl substituted with methoxy.

5. The azo dye of claim 2 wherein:
R¹ and R² are allyl.

6. The azo dye of claim 4 wherein:
R¹ and R² are allyl.

7. The azo dye of claim 2 wherein:
D is phenyl substituted by bromine and cyano.

* * * * *